United States Patent
Bittles et al.

(10) Patent No.: US 11,956,300 B2
(45) Date of Patent: *Apr. 9, 2024

(54) MESSAGE SWITCHING

(71) Applicant: INTERNATIONAL BUSINESS MACHINES CORPORATION, Armonk, NY (US)

(72) Inventors: William Bittles, Winchester (GB); David Granshaw, Eastleigh (GB); John Brian Pickering, Romsey (GB)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 619 days.

This patent is subject to a terminal disclaimer.

(21) Appl. No.: 16/553,638

(22) Filed: Aug. 28, 2019

(65) Prior Publication Data

US 2019/0387045 A1 Dec. 19, 2019

Related U.S. Application Data

(63) Continuation of application No. 12/768,475, filed on Apr. 27, 2010, now Pat. No. 10,412,146.

(30) Foreign Application Priority Data

Apr. 27, 2009 (EP) ..................... 09158809

(51) Int. Cl.
*H04L 67/02* (2022.01)
*H04L 69/10* (2022.01)
(Continued)

(52) U.S. Cl.
CPC .............. *H04L 67/02* (2013.01); *H04L 69/10* (2013.01); *H04L 69/24* (2013.01); *H04L 43/0882* (2013.01); *H04L 43/16* (2013.01)

(58) Field of Classification Search
None
See application file for complete search history.

(56) References Cited

U.S. PATENT DOCUMENTS 5,974,416 A * 10/1999 Anand ...................... H04L 9/40
709/203
6,243,755 B1 * 6/2001 Takagi ................ G06F 11/3438
711/170

(Continued)

FOREIGN PATENT DOCUMENTS

CN 1762154 A 4/2006
CN 101021764 A 8/2007
(Continued)

OTHER PUBLICATIONS

CN Published Appln. 102301652A, Office Action, dated Mar. 25, 2014, 6 pg.

(Continued)

*Primary Examiner* — Dhairya A Patel
(74) *Attorney, Agent, or Firm* — CUENOT, FORSYTHE & KIM, LLC (57) ABSTRACT

A communication system includes a server and a client that transmits messages to the server. The messages include data and descriptive tags and may be in XML format. The server initiates a negotiation with the client relating to message format switching. If the client indicates that the client can accept message format switching, the server instructs the client to switch further messages to a simpler message format including solely data.

20 Claims, 5 Drawing Sheets

(51) Int. Cl.
*H04L 69/24* (2022.01)
*H04L 43/0882* (2022.01)
*H04L 43/16* (2022.01)

(56) References Cited

U.S. PATENT DOCUMENTS

| | | | | |
|---|---|---|---|---|
| 7,028,312 | B1* | 4/2006 | Merrick | G06F 9/547 709/219 |
| 7,111,076 | B2* | 9/2006 | Abjanic | H04L 67/02 709/201 |
| 7,117,193 | B1* | 10/2006 | Basko | G06Q 30/02 709/224 |
| 7,162,542 | B2* | 1/2007 | Abjanic | H04L 67/04 709/239 |
| 7,587,487 | B1* | 9/2009 | Gunturu | H04L 67/1001 709/227 |
| 7,647,415 | B1* | 1/2010 | Sandoz | H04L 69/08 709/230 |
| 7,743,162 | B2* | 6/2010 | Matsushima | H04L 69/18 709/230 |
| 7,814,404 | B2* | 10/2010 | Shenfield | G06F 8/70 715/200 |
| 7,925,792 | B2* | 4/2011 | Tian | H04L 67/568 709/248 |
| 7,974,966 | B2* | 7/2011 | Robie | G06F 9/542 707/802 |
| 10,412,146 | B2* | 9/2019 | Bittles | H04L 67/02 |
| 2001/0010685 | A1* | 8/2001 | Aho | H04L 69/24 370/352 |
| 2001/0049702 | A1* | 12/2001 | Najmi | G06F 16/9535 707/E17.109 |
| 2003/0229778 | A1 | 12/2003 | Oesterreicher | |
| 2004/0107244 | A1* | 6/2004 | Kuo | H04L 69/08 709/203 |
| 2004/0185885 | A1* | 9/2004 | Kock | H04L 67/60 455/466 |
| 2004/0201600 | A1* | 10/2004 | Kakivaya | G06F 9/54 715/234 |
| 2004/0255046 | A1* | 12/2004 | Ringseth | H04L 67/133 719/330 |
| 2004/0264498 | A1 | 12/2004 | Feuerstraeter | |
| 2005/0124324 | A1 | 6/2005 | Thomas | |
| 2007/0189159 | A1 | 8/2007 | Gerdes | |
| 2008/0005226 | A1* | 1/2008 | Subbian | H04L 51/58 709/202 |
| 2008/0077708 | A1* | 3/2008 | Scott | H04L 67/55 707/999.01 |
| 2008/0155080 | A1* | 6/2008 | Marlow | H04L 51/04 370/431 |
| 2008/0168469 | A1* | 7/2008 | Feingold | H04L 69/24 719/313 |
| 2009/0089417 | A1* | 4/2009 | Giffin | H04L 51/212 709/224 |
| 2009/0106371 | A1 | 4/2009 | Schmidt-Karaca | |
| 2009/0285209 | A1* | 11/2009 | Stewart | H04L 65/1069 370/389 |
| 2010/0274846 | A1 | 10/2010 | Bittles | |
| 2011/0178793 | A1* | 7/2011 | Giffin | H04L 51/212 704/9 |

FOREIGN PATENT DOCUMENTS

| | | |
|---|---|---|
| CN | 102301652 A | 12/2011 |
| EP | 2347545 A1 | 7/2011 |
| JP | 2002251383 A | 9/2002 |
| JP | 2004280408 A | 10/2004 |
| JP | 2012524924 A | 10/2012 |
| WO | 2010124921 A1 | 11/2010 |

OTHER PUBLICATIONS

U.S. Appl. No. 12/768,475, Non-Final Office Action, dated Nov. 10, 2011, 17 pg.

U.S. Appl. No. 12/768,475, Final Office Action, dated Apr. 20, 2012, 22 pg.

U.S. Appl. No. 12/768,475, Examiner's Answer, dated Jan. 18, 2013, 28 pg.

U.S. Appl. No. 12/768,475, Decision on Appeal, dated Aug. 5, 2015, 14 pg.

U.S. Appl. No. 12/768,475, Non-Final Office Action, dated Nov. 24, 2015, 14 pg.

U.S. Appl. No. 12/768,475, Final Office Action, dated Jun. 8, 2016, 19 pg.

U.S. Appl. No. 12/768,475, Examiner's Answer, dated Feb. 28, 2017, 11 pg.

U.S. Appl. No. 12/768,475, Decision on Appeal, dated Jan. 28, 2019, 11 pg.

U.S. Appl. No. 12/768,475, Notice of Allowance, dated May 2, 2019, 8 pg.

* cited by examiner

MESSAGE SWITCHING

BACKGROUND

Field of the Invention

This invention relates to a method of operating a communication system, and to the system itself. The method and system allow dynamic switching of message formats.

Description of the Related Art

In computer technology, reference to a client and server describes the operation of two computers or programs in which one, the client, requests services and/or information from the other, the server. Standard networked functions such as email exchange, web access and database access, are based on the client and server model. Although client-server architectures are perhaps the most common, other modes of co-operation are possible. For instance, if neither computer holds the main data and applications but rather each is responsible for its own workings, then the two computers or computer programs are said to be peers in a peer-to-peer relationship.

Communication between computers, irrespective of their behavioural relationship, is governed by a set of rules called a protocol. Typical examples include http (hypertext transfer protocol) used for many World Wide Web applications, and ftp (file transfer protocol) used when one computer requests and receives a file from another. As well as the protocol, or set of rules, controlling communication, actual communication objects, or messages, also conform to a set of formatting rules which define how they are to be interpreted by the recipient. Typical formats include HTML (Hypertext Markup Language) which is the basic format for World Wide Web pages and XML (eXtensible Markup Language), a flexible tagging language used for many different and varied application message types. Such markup languages are useful in defining system interfaces and message formats. But they do have drawbacks: with a busy workload when lots of messages are passed between computers or computer programs, they may affect performance detrimentally.

BRIEF SUMMARY

According to a first aspect of the present invention, there is provided a method of operating a communication system, the system comprising a server and a client, the method comprising the steps of receiving messages from the client, the messages of a first format comprising data and descriptive tags, initiating a negotiation with the client relating to message format switching, receiving an indication from the client that the client can accept message format switching, and transmitting to the client an instruction to transmit messages of a second format.

According to a second aspect of the present invention, there is provided a client in a communication system comprising a server and a client, wherein the client is arranged to transmit messages of a first format comprising data and descriptive tags, receive a handshake seeking verification that the client supports message format switching, transmit an indication that the client can accept message format switching, receive an instruction to switch message format, and transmit further messages of a second format.

According to a third aspect of the present invention, there is provided a computer program product embodied on a computer readable storage medium for operating a server, the product comprising instructions receiving messages from the client, the messages of a first format comprising data and descriptive tags, initiating a negotiation with the client relating to message format switching, receiving an indication from the client that the client can accept message format switching, and transmitting to the client an instruction to transmit messages of a second format.

Owing to the invention, it is possible to improve the performance of complex computer systems that use XML as a message format. This invention can allow the server and client to switch message formats, which allows the system to benefit from all the flexibility of a system designed using markup languages, but at the same time take advantage of the performance improvements of using more efficient message format.

Embodiments of the present invention can further comprise monitoring message workload from the client, performing a statistical analysis on the message workload and initiating the negotiation between the server and client according to the statistical analysis. The server can use performance statistics to determine when to switch to the second message format. This can ensure that the switch to the simpler message format only takes place when it is actually efficient to do so. The performing of the statistical analysis on the message workload can comprise determining that the workload from the client is above a predetermined threshold. The server can use a methodology in which it is monitoring the workload from each connected client, and when a predetermined threshold is reached, such as a specific message count per second, this can be used as the trigger for switching to the second message format. This can result in the switching only occurring when there is sufficient throughput to justify the overhead of negotiating and changing protocols.

Embodiments of the present invention can further comprise transmitting a description of the second format to the client. In a first embodiment, the client may already be aware of the structure of the second message format that is to be used after the switch is agreed. However, the client may be unaware of the second message format, but nevertheless is sufficiently flexible that it has the capability to switch away from the current message format. In this case, the server will provide to the client a description of the second message format, and the client will configure itself according to this description. This improves the overall performance of the system, as the system will be able to incorporate some clients who are unaware of the message switching functionality of the server. This will decrease the size of more of the messages flowing in the system.

Embodiments of the present invention can further comprise verifying that the messages are not being modified between the client and the server. Depending upon the nature of the communication system, the routing between the client and server may not be direct. Other intermediate components may receive and transmit the messages that flow between the client and server. In this case, it is important that the server verify that the messages received from the client are not modified by any intermediate component. This will ensure that the change to the second message format, which removes some of the information from the message, with respect to the first message format, does not create a problem for any intermediate component. If the server cannot verify that the messages are not being modified between the client and the server, or discovers that they are being modified, then the server will not initiate the switch to the second message format. A server can safely request to switch if it is the final server or if the next server in the chain has already switched.

BRIEF DESCRIPTION OF THE SEVERAL VIEWS OF THE DRAWINGS

Embodiments of the present invention will now be described, by way of example only, with reference to the accompanying drawings, in which.

DETAILED DESCRIPTION

Figure 1:
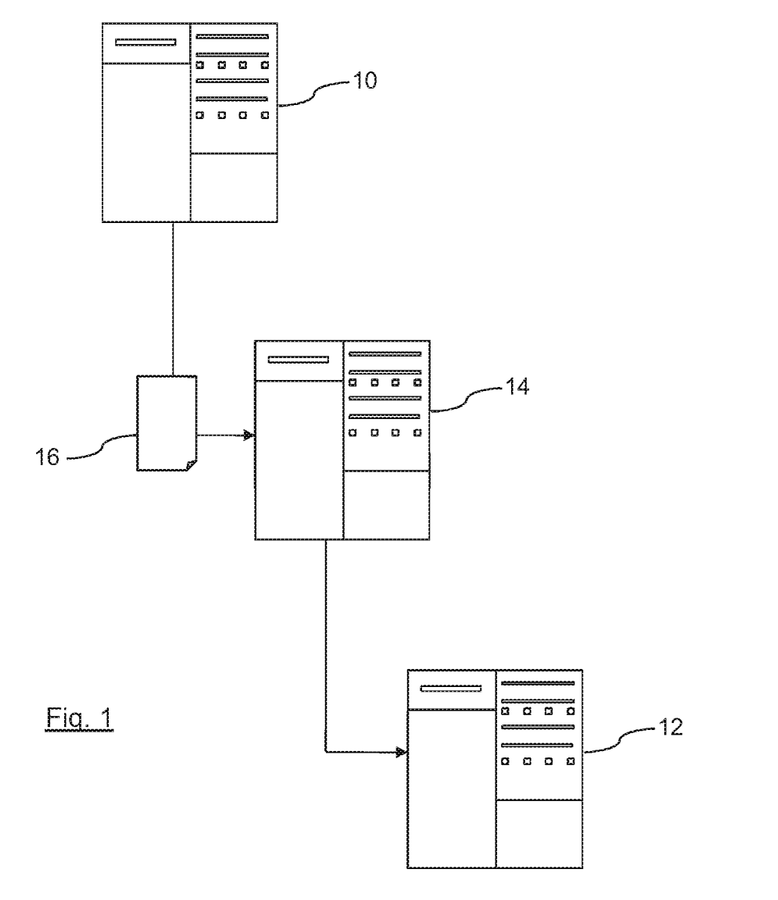
FIG. 1 is a schematic diagram of a communication system in accordance with an embodiment of the invention.

An example of a communication system is shown in FIG. 1. The system comprises a client 10, a server 12 and an intermediate component 14. The client 10 is operable to send a message 16 to the server 12. The various machines 10, 12 and 14 form part of a large communication network such as an Intranet, where multiple machines are interconnected by some suitable network technology. It should be noted that the designation of a machine as a client or server in this communication system is a logical designation. The machine 10 that originates the message 16 is the client, and the receiving machine 12 is the server, but any machine can be a client if they are making a request of another machine, which becomes the server.

The structure of the message 16 is determined by the specific protocol that is being used by the communication system. This could be XML, for example. The message format comprises data and descriptive tags. The tags describe the data that is being carried in the message 16. For example, the message 16 may contain <location> PARIS</location>, where the "PARIS" part is the data in the message, the "<location>" part defines the start of some specific type of data, and the "</location>" part defines the end of that specific type of data; in this case, the data type is defined as "location". The latter two parts of the message 16 are the descriptive tags in the message 16. The presence of the descriptive tags assists the receiving server 12 in the understanding and handling of the message 16.

The communication system shown in FIG. 1 could be part of a backend system that supports a commercial website. As users of the website purchase goods on the website, messages 16 will flow round the system to and from different machines. For example one machine may be operating principally as a database storing client account details. When a user with an account makes a purchase, then one or more messages 16, in the XML format, will be sent to the particular machine for processing by that machine. For a busy website, this will result in a large number of messages 16 being produced.

Figure 2:
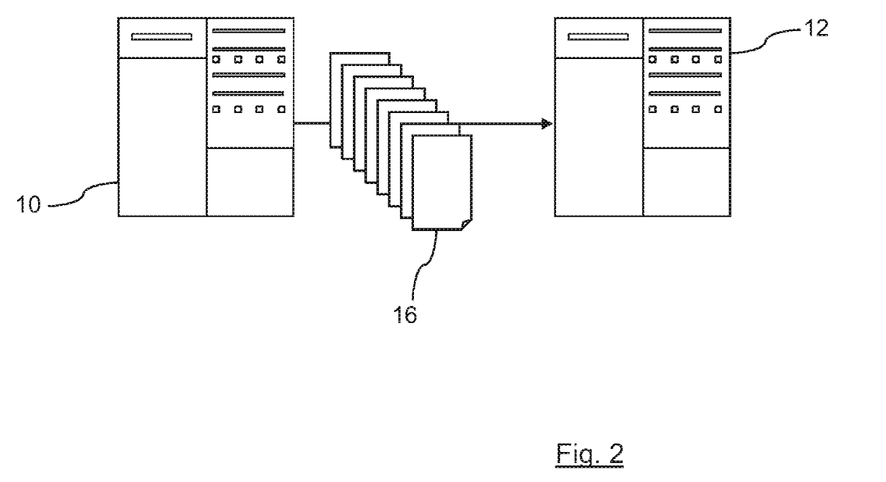
FIG. 2 is a schematic diagram of a communication system in accordance with an embodiment of the invention.

FIG. 2 shows part of the communication system with a client 10 and a server 12, in which a large number of messages 16 flow from the client 10 to the server 12. In many applications, the number of messages 16 that are being transmitted from the client 10 to the server 12 could be of the order of many thousands per second. Each of these messages 16 will use bandwidth between the client 10 and server 12. In a network situation, the usable bandwidth of the network will be reduced, and/or the latency of the network will increase, both of which have performance implications for the operation of the communication system or any other system dependent on the network.

According to an embodiment, to alleviate the problem of overloading on the communication channel between the client 10 and the server 12 and thereby the network as a whole, the communication system has the ability to switch message format. In the right circumstances, the communication system switches from the first format of using data and descriptive tags to a second, simpler, format of just data, or wire format. The descriptive tags can be stripped from the messages 16, by the client 10, before they are transmitted to the server 12. This will reduce the size of the messages 16, and therefore the bandwidth used by the messages 16. The larger XML messages can be replaced with wire format messages which do not contain the descriptive tags. The wire format version may, for example, be a single set of bytes with XML tags removed.

The changeover to the second message format occurs when the communication system determines that it is advisable to do so. Information about the message workload between the client 10 and server 12 is obtained in order to make this determination. For example, the communication system monitors the message workload from the client 10, performs a statistical analysis on the message workload and initiates a negotiation between the server 12 and client 10 according to the result of the statistical analysis. In one embodiment, performing the statistical analysis on the message workload can include determining that the workload from the client 10 is above a predetermined threshold. A specific message count per time period can be used as the trigger for switching to the second message format. This can ensure the switching occurs when the bandwidth required will be reduced by the switch to the second message format.

In the communication system environment, a typical client 10 may have no way of knowing what has happened to any request messages 16 that have been produced by the client once they have been transmitted. The messages 16 could have been mediated and handled beyond all recognition, for example by an intermediate component 14, and the client 10 would be unaware of this. Therefore, in an embodiment of the invention, message format switching may only be initiated by a server 12; if the intermediate component 14 acts as a server to the client 10, then it may request format switching. Logically, it may then function as a client to server 12. In that case, server 12 must initiate the request for the intermediate component 14 to switch its format. However, in this embodiment, if the intermediate component 14 functions only as an intermediary between client 10 and server 12, it may not request client 10 to format switch.

Figure 3:
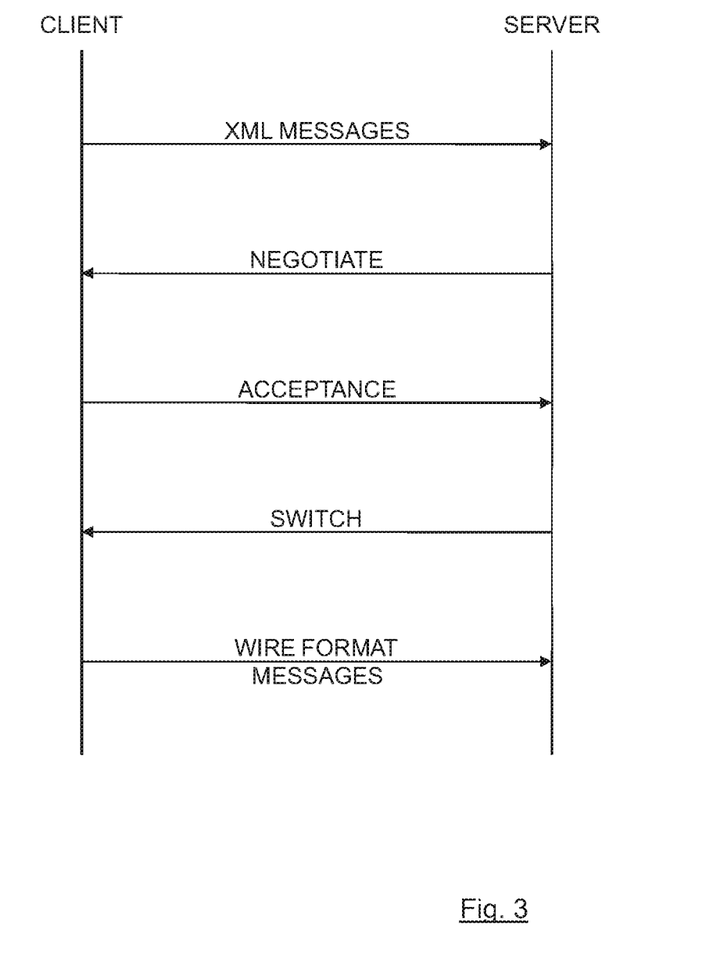
FIG. 3 is a diagram showing communication flow with a communication system in accordance with an embodiment of the invention.

The protocol for format switching negotiation includes the basic steps described below, as shown in FIG. 3. The client 10 transmits messages to the server 12, for example in the XML format, and the server 12 is able to communicate back with the client 10. The server 12 tracks the workload from each client 10, and using empirical statistical analysis techniques, decides which client's message workload is significant enough to benefit from a switch from XML messages to wire format messages. The server 12 tracks this client's messages 16 as they pass through to verify that they are not being modified by another process which expects the message 16 in the current format. When the server 12 has verified that the message format can indeed be switched, because any code that touches the message can support the new wire format, then the server 12 can negotiate with the client 10.

In a negotiation, the server 12 initiates a handshake with the client 10 to verify that the client 10 supports protocol switching. The client 10 may already have the wire format support defined, or if the client 10 can switch dynamically, for instance in an interpreted language environment, then the server 12 will send a description of the format to which it expects the client 10 to switch. Once the wire format has been agreed and instantiated, the server 12 informs the client 10 of when to switch, and each party switches to the new wire format. The server 12 can invalidate the agreement at any time by simply informing the client 10 to switch back to the original format. Once the switch has been made, then future messages will be of the wire format.

Figure 4:
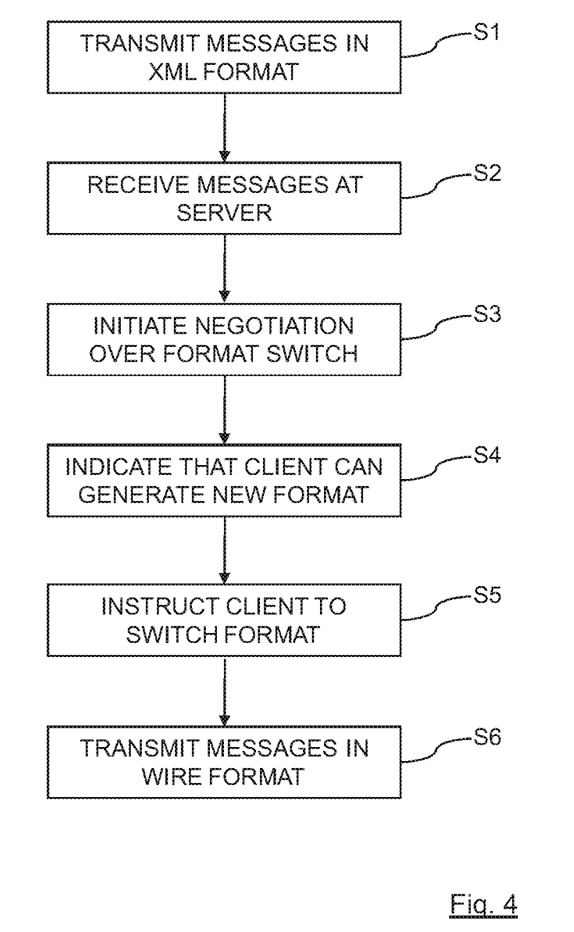
FIG. 4 is a flowchart of a method of operating a communication system in accordance with an embodiment of the invention.

FIG. 4 summarises the method of operating the communication system. The method comprises, firstly, step S1 of transmitting messages 16 from the client 10, the messages 16 of a first format comprising data and descriptive tags and secondly, step S2 of receiving the messages 16 at the server 12. At step S3, the server 12 initiates a negotiation between the server 12 and the client 10, from whom the messages 16 are being received, in relation to the issue of message format switching. This negotiation can take the form of a handshake between the server 12 and client 10, according to any protocol that both machines will support.

At step S4, the client 10 indicates that it can accept message format switching, and generate messages according to a new format, either because the client 10 is already aware of the second message format or the client 10 can support dynamic format switching. If the client 10 is of the latter case, then the server 12 will send a description to the client 10 of the new format which the server 12 wishes the client 10 to adopt. The client 10 will then store this description locally. At step S5, the server 12 instructs the client 10 to switch message format, and at step S6 the client 10 transmits any further messages to the server 12 in the second format, where the messages may solely include data.

The method of FIG. 4 can further include monitoring the message workload from the client 10, performing a statistical analysis on the message workload and initiating the negotiation between the server 12 and client 10 according to the result of the statistical analysis. Performing the statistical analysis on the message workload can include determining that the workload from the client 10 is above a predetermined threshold. Therefore prior to the step S3, the server 12 must make a determination that the client 10 is a candidate for a switch to the second, more efficient, message format. This can be done by monitoring the workload provided by the relevant client 10.

The Web Services Description Language (WSDL) is an XML-based language that provides a model for describing Web services. WSDL defines services as collections of network ports and provides an XML format. Messages are abstract descriptions of data being exchanged, and port types are abstract collections of supported operations. The protocol and data format specifications for a particular port type constitute a reusable binding, where the operations and messages are then bound to a network protocol and message format. In this way, WSDL describes the public interface to the web service. WSDL is often used in combination with the Simple Object Access Protocol (SOAP) and XML schema to provide web services over the Internet. A client program connecting to a web service can read the WSDL to determine what functions are available on the server. Any special data types used are embedded in the WSDL file in the form of XML schema. The client can then use SOAP to actually call one of the functions listed in the WSDL.

Figure 5:
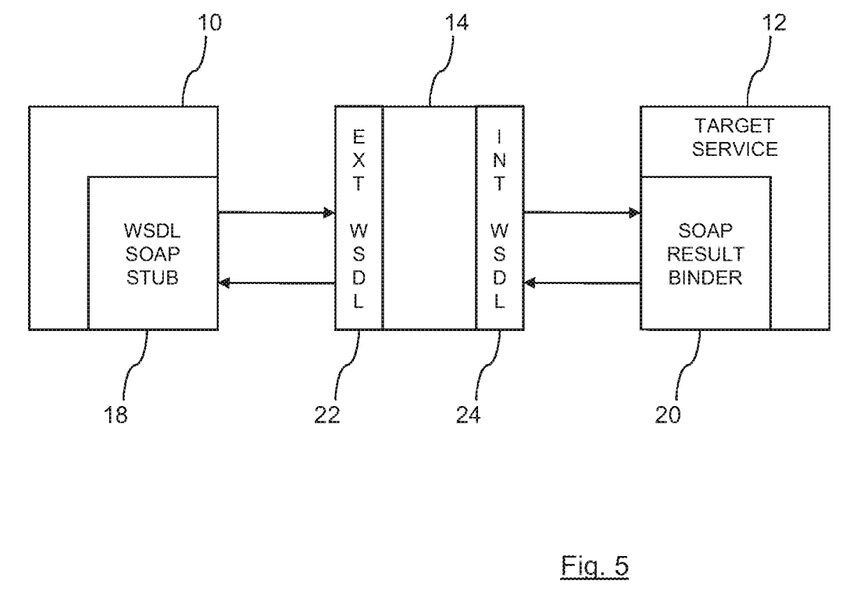
FIG. 5 is a schematic diagram of an embodiment of the communication system.

FIG. 5 shows how WSDL can be deployed into an intermediate component 14 (a bus) that transforms the internal WSDL 24 into a form more suitable for use by external clients 10, by at least removing actual physical machine and ports for security reasons. The new external WSDL is downloaded by clients 10 who use it to generate a stub 18 that allows the client 10 to invoke the Web Service 12 as it would any other language method. This stub 18 works by taking the binary parameters and wrapping them into the XML SOAP structure and sending them to the predefined target (HTTP Port, or Java Messaging Service [JMS] Queue for example) that was defined by the external WSDL 22.

When the WSDL arrives at the bus 14, the user has the opportunity to intercept the message and change the content of the message or re-route it to a completely different service 12. The message passes through the bus 14 until it reaches the invoker 20, which converts the SOAP message back into a binary form that allows the actual invocation of the binary functionality described by the WSDL. A binary result is built into a SOAP response and sent back through the bus to the client 10.

To benefit from the possibility of format switching, the system can allow an administrator to configure the service 12 so that it uses wire format from the start, or can allow the bus 14 to monitor the workload of a particular service 12 and determine whether it would be beneficial to switch formats for performance reasons. The bus 14 can follow some easy rules to decide if it is possible to switch formats, for instance by comparing the WSDL port of the external WSDL 22, with the WSDL port of the internal WSDL 24, to verify that the message was not changed en route. If a component were "mediating" the message, the mediation could be queried to see if it could support a wire format message.

Once the decision has been made to switch to a wire format, the stub 18 that the client 10 is using is sent a message informing it not to wrap the client binary data into a SOAP message but to send the message directly to the bus 14. The bus 14 would then forward the message straight to the invoker 20, which would use the original data to call the target service 12 directly. If the system were changed, for instance a mediation were added to the system for this service, then the client stub 18 can be sent a message informing it to switch back to the SOAP format of the message.

We claim:

1. A computer-implemented method within a server computer, comprising:
   receiving, from a client computer, a message in a first format;
   initiating, based upon a message workload of the server computer, a negotiation with the client computer to determine whether the client computer accepts message format switching;
   receiving, from the client computer, an indication that the client computer accepts message format switching; and
   transmitting, to the client computer after receiving the indication, an instruction to transmit messages in a second format.

2. The method of claim 1, wherein
   the first format includes data and descriptive tags for the data.

3. The method of claim 2, wherein
   the first format is XML.

4. The method of claim 2, wherein
the second format is wire format that do not contain descriptive tags.

5. The method of claim 1, wherein
the client computer strips descriptive tags from messages sent to the server computer in response to receiving the instruction to transmit message in the second format.

6. The method of claim 1, wherein
the message workload is analyzed for each client computer with which the server computer is connected.

7. The method of claim 6, wherein
the client computer is selected to initiate the negotiation based upon the message workload with the client computer exceeding a predetermined threshold.

8. The method of claim 1, wherein
the negotiation includes the server computer sending to the client computer a description of the second format.

9. A server computer system, comprising:
a hardware processor configured to initiate the following executable instructions:
  receiving, from a client computer, a message in a first format;
  initiating, based upon a message workload of the server computer system, a negotiation with the client computer to determine whether the client computer accepts message format switching;
  receiving, from the client computer, an indication that the client computer accepts message format switching; and
  transmitting, to the client computer after receiving the indication, an instruction to transmit messages in a second format.

10. The system of claim 9, wherein
the first format includes data and descriptive tags for the data.

11. The system of claim 10, wherein
the first format is XML.

12. The system of claim 10, wherein
the second format is wire format that do not contain descriptive tags.

13. The system of claim 9, wherein
the client computer strips descriptive tags from messages sent to the server computer system in response to receiving the instruction to transmit message in the second format.

14. The system of claim 9, wherein
the message workload is analyzed for each client computer with which the server computer system is connected.

15. The system of claim 14, wherein
the client computer is selected to initiate the negotiation based upon the message workload with the client computer exceeding a predetermined threshold.

16. The system of claim 9, wherein
the negotiation includes the server computer sending to the client computer a description of the second format.

17. A computer program product, comprising:
a computer hardware storage device having computer readable instructions stored therein,
the computer readable instructions, which when executed by a server computer system, causes the server computer system to perform:
  receiving, from a client computer, a message in a first format;
  initiating, based upon a message workload of the server computer system, a negotiation with the client computer to determine whether the client computer accepts message format switching;
  receiving, from the client computer, an indication that the client computer accepts message format switching; and
  transmitting, to the client computer after receiving the indication, an instruction to transmit messages in a second format.

18. The computer program product of claim 17, wherein
the first format is XML,
the second format is wire format that do not contain descriptive tags, and
the client computer strips descriptive tags from messages sent to the server computer system in response to receiving the instruction to transmit message in the second format.

19. The computer program product of claim 17, wherein
the message workload is analyzed for each client computer with which the server computer system is connected, and
the client computer is selected to initiate the negotiation based upon the message workload with the client computer exceeding a predetermined threshold.

20. The computer program product of claim 17, wherein
the negotiation includes the server computer sending to the client computer a description of the second format.

* * * * *